J. W. MURFEE.
Subsoil Plow.
No. 106,192.
Patented Aug. 9, 1870.
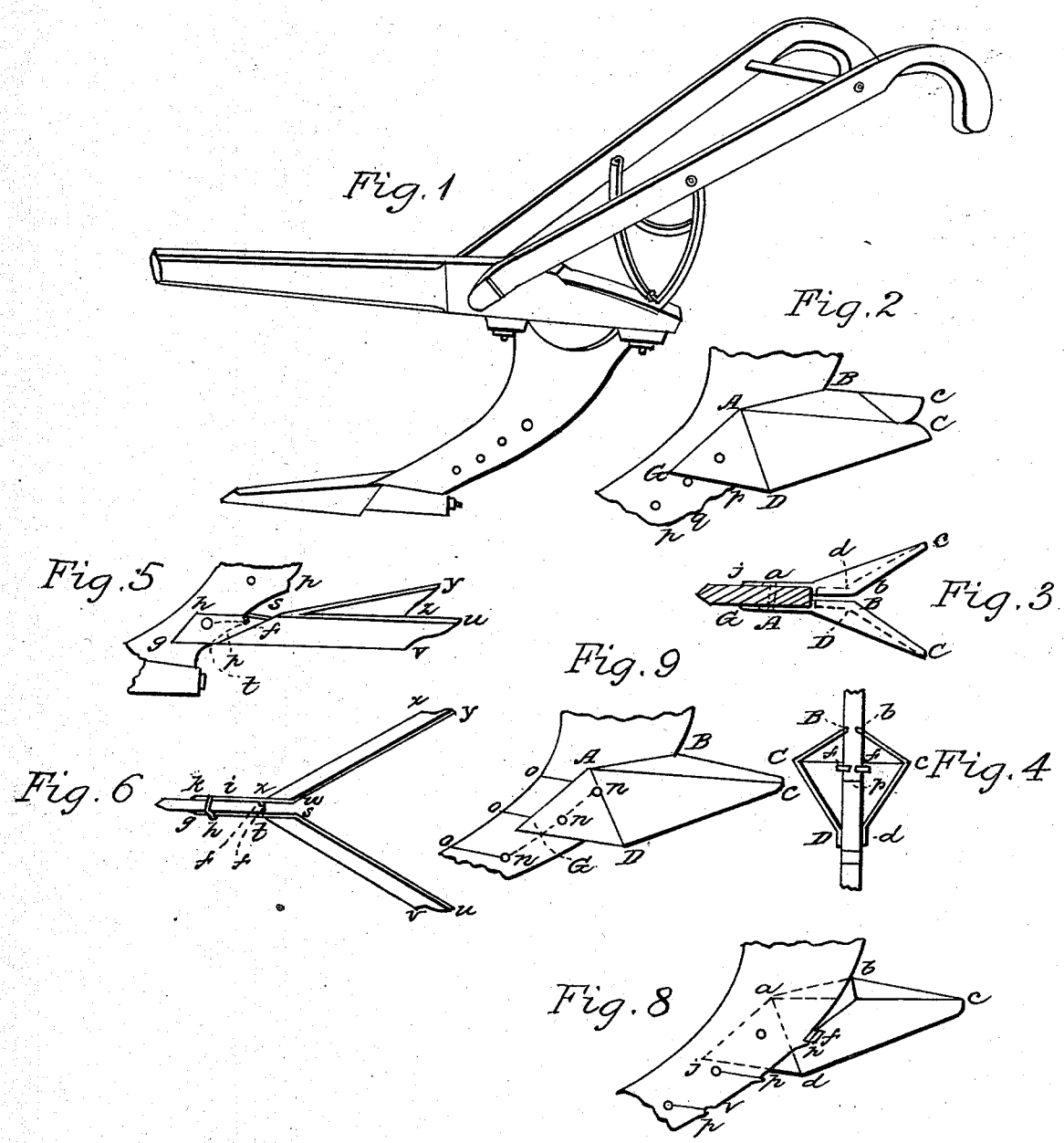
Witnesses:
Inventor:

UNITED STATES PATENT OFFICE.

JAMES W. MURFEE, OF HAVANA, ALABAMA.

IMPROVEMENT IN ATTACHMENTS TO PLOWS.

Specification forming part of Letters Patent No. 106,192, dated August 9, 1870.

*To all whom it may concern:*

Be it known that I, JAMES W. MURFEE, of Havana, in the county of Hale, State of Alabama, have invented a new and useful Improvement in Cultivating and Opening Attachments to the Shank, Colter, or Helve of Subsoil-Plows; and I do hereby declare that the following is a full, clear, and exact description thereof, which will enable others skilled in the art to make and use the same, reference being had to the accompanying drawings, forming a part of this specification.

Figure 1 is a perspective view of the plow shank, colter, or helve with beam and handles attached, showing holes in colter-shank for attachment of opener and cultivator. Fig. 2 is a perspective view of the combined turn-plow, opener, and cultivator attachment. Fig. 3 is a horizontal section through the turn-plow, opener, and cultivator attachment. Fig. 4 is a vertical section through the same, and also a view from the rear, showing the shank (colter) and space within the rear part of the turn-plow, opener, and cultivator attachment. Fig. 5 is a perspective view of the combined scraper and cultivator attachment. Fig. 6 is a horizontal projection of the same, with section through the colter. Fig. 8 is elevation of right side of opener and cultivator, viewed from the left, showing the mode of attachment by means of one bolt through shank, projection on rear of colter, and flange on opener. Fig. 9 is elevation of right side of opener, showing mode of attachment by means of one bolt with tap and half-pins.

My invention consists in the attachment of the openers A D C B *a d c b*, Figs. 2, 3, 4, 8, 9, to one or both sides of the colter-shank of a subsoil-plow, with a view of opening and cultivating the surface of the ground, while the under surface or subsoil is pulverized by the hoe or share of the plow, which is attached to the foot of the colter-shank; and also in the attachment horizontally of one or two inclined knife-scrapers, *g h s t u v i k w x y z*, Figs. 5, 6, 7, to one or both sides of the shank of a plow, for the purpose of scraping, pulverizing, and cultivating the upper surface of the ground, while the under soil is pulverized by the share at the foot of the colter or helve of the same plow.

The combined turn-plow, cultivator, and opener A D C B *a d c b* is wedged or knife-edge to the front, as shown in Fig. 3, and is wedged edge downward, as shown in Fig. 4. In this way the opener cuts forward and downward. The top of this opener is covered by the two inclined faces A B C *a b c*, Figs. 2, 3, 4, for the purpose of giving strength and stability to the mold-board faces A D C *a d c*, and to prevent clods of earth from falling back into the furrow. All of these attachments may be made of wrought or cast metal.

The pyramidal turn-plow, opener, and cultivator attachment A D C B *a d c b* and the knife scrapers and cultivators *u v t s y z x w* are attached to the colter-shank of the plow by the flanges or plane and vertical surfaces A D G *a d j*, and *g h s t i k w x*. The flanges A D G *a d j* are attached to the oblique edge A D *a d* of the pyramidal opener. The flange *g h s t* and scraper *s t u v* and the flange *i k w x* and scrapers *w y z x* are made so that when these flanges are vertical the plane of the scraper shall have the proper inclination for shaving and uprooting the grass from the surface of the ground—say make an angle with horizon of fifteen degrees or thirty degrees, more or less. The attaching-flanges hug close to the sides of the colter-shank of the plow. Their front and bottom edges are beveled off to a feather-edge, so as to cut forward and downward, and they are made as thin as the nature of the metal will admit, having regard to strength, so that the colter may thereby be thickened at the point of attachment as little as practicable. They are secured in place to the colter-shank in the following way: Projections *p p p* are made on the rear edge of the colter-shank parallel to the horizon, and opposite these projections and equidistant from them holes are made in the shank, and so far to the rear as to be within that part of the metal which sustains a force of compression in rear of the axis of the colter, so as to preserve the strength of the metal. A bracket, *f*, projects from the interior sides of the openers and scrapers and rests on top of the projections *p p p* of the colter, and through the flanges *a d j* A D G, Figs. 2, 3, and *g h t s i k x w*, Figs. 5, 6, and 7, a hole is made, so that when the attachments are in place and horizontal and the rear brackets, *f*, resting upon the projection *p* of the colter, the hole in the flange will coincide with that in the colter, and a bolt and countersunk nut fastens the two pieces of metal securely together. The head of the bolt and nut are countersunk, so as to make no projection from the side of the attachment. This bolt and nut prevent the attachment from moving laterally and prevent the front end from moving up or down, while the brackets $f$ and the projections $p\ p\ p$ prevent the rear end from moving down, and the inclined rear edge of the colter and the bracket $f$ prevent any movement upward. Thus the attachment is secured against motion in any direction as regards its position on the colter. If the rear edge of the colter should not be sufficiently inclined, projections $q\ q$, Figs. 2, 8, may be made above $p\ p$, so as to come just above the bracket $f$ and prevent motion upward.

The turn-plow surfaces are plane or slightly warped, like the mold-board of a turn-plow; but if warped they should have only turn enough near the top edge and upper rear corners, $C\ c$, to give the earth a pitch as it leaves the surface of the mold-board and throw it more or less outward. There should be very little or no warp near the front and bottom edges.

The form of the opener is something like the bow of a boat. The lower and front edges are sharp, while the upper and rear are broad. Thus it cuts forward and downward. The bottom edge fits close to the colter, as the sides of the hull do to the keel, and the front edge hugs the colter, as the sides of the bow to the fore stem. These mold-board openers may be of any convenient size, and may vary in size just as other mold-boards vary, according to the work to be done. For opening to sow seed have narrow opener, for early cultivation use deeper and wider opener, and wider and shallower for later cultivation. The angles are acute, so as to cut easily forward and downward.

The scraper-cultivators, Figs. 5, 6, and 7, consist of plates of metal—iron or steel, cast or wrought—cut in form of double trapezoids. In Fig. 7, $i\ k\ w\ y\ z\ x$, the scraper for right side is shown developed on a plane, and the trapezoids are united at their ends at an obtuse angle, $k\ x\ z$, so that when folded or bent along the line $x\ w$ or $x\ H$ the anterior surface $i\ k\ x\ w$ or $i\ k\ x\ H$ will become perpendicular to the horizon and fit close to the side of the shank, while the posterior $x\ w\ z\ y$ makes an acute angle with the horizon. The edges $k\ x$ and $x\ z$ lie in the same horizontal plane and make an obtuse angle with each other. There is another scraper-cultivator for the left side of the colter, made exactly to correspond to and match this one. These scrapers thus attached present sharp and feather edges to the front and downward. The blade of the scraper is beveled on its inferior edge, and is acutely set both to the front and to the horizon. Its superior surface is slightly concaved, so as to slip the earth toward the end. The said scrapers are made sufficiently thick to resist all pressure to which they are subjected—say three-eighths of an inch, more or less, according to strength of metal used; and they are made sufficiently wide to displace the earth as it passes through—two or four inches, more or less. The upper edge is elevated like the back of a knife when cutting a stick that lies horizontally. It is of such length that its lower edge will make as acute an angle as practicable with the line of draft—twenty degrees or thirty degrees, more or less—and thus pass as acutely as practicable through the earth, splitting and cutting its way easily as it is drawn. These scrapers are long enough to cultivate any width of space desirable.

The operations are as follows: The plow-share (subsoil) attached to the foot of the colter (inclined colter-helve) pulverizes the earth below, (the subsoil,) while my improved turn-plow, opener, and cultivator attachment $A\ D\ C\ a\ d\ c$ throws the top soil open, so that fertilizers may be sown or seed planted; or, when used on the growing crop, the opener will serve as a cultivator, throwing the surface dirt to or from the plants, while the ground below is thoroughly worked (pulverized) by the plow-hoe (subsoil-plow) at the foot of the colter. One or both sides of the opener may be used at the same time, so as to throw the surface dirt on one or both sides, as may be desired. As this opener-cultivator presents a sharp wedge edge to the front, it is easily drawn horizontally through the earth; and as it also presents a sharp wedge edge downward it will readily sink into the earth at any desired depth; and this opener and cultivator, being thus shaped, will not have a tendency and effect to keep the plow-hoe from going to proper depth into the ground, as is the case with other openers which have been attached to plow-shanks. A horizontal section is a >, with sharp point to the front, and shows its power to cut forward. A vertical section perpendicular to the shank is a sharp V, with point downward, and shows that the attachment must cut easily in this direction. The upper edges being opened as they proceed to the rear, and the rear end being opened and widened, the earth is displaced by the splay of these top and rear sides, while the draft of the plow is increased in the least possible manner. The sharp front and bottom wedge edges do the cutting forward and downward, while the rear and to pedges (sides) do the opening and turning. The inclined top surfaces prevent any clods of earth from falling back in the opened furrow or lodging in the opener, where they would add weight to the plow. They also give strength to the mold-board, and when cultivating a crop they cause the earth to be well thrown up or off.

This turn-plow, opener, and cultivator attachment supersedes the use of the common bull-tongue scooter and shovel plows, since with a given animal-power it does a much greater quantity and variety of work. It is also more efficient in pulverizing the earth and cultivating the surface than the common turn-plow. All of its work is done with the greatest possible ease to the team, and the ground is left in the best possible condition for the growth of plants, the entire soil and subsoil being thoroughly opened and pulverized, while any grass on the surface is killed either by cutting or covering. Thus the two important conditions of deep and thorough pulverization and surface culture are secured with least power at one and the same time. By the adjustments, high or low, the work may be deep or shallow.

The scraper and cultivator attachments $x\ y\ z\ w$, $t\ s\ u\ v$, weed the surface of the ground, cleaning off grass by cutting and covering, while the plow-hoe at the foot of the colter pulverizes the under soil. The grass on the surface is cut and covered and the clean earth thrown gradually and easily up to the growing plants. These scrapers are adapted by their varied adjustments to different stages of cultivation, according to the age of the plant. They are fixed in the upper holes for early scraping or weeding and deep culture when the plants are young. Later, as the plants grow and the roots extend, they are moved to suit the requirements of the plants, being lower as the plants grow older.

With this improvement and combination, deep flat surface culture or shallow flat surface culture are obtained as required, and the work is done by the least possible amount of animal-power.

This scraper cultivator attachment performs work much superior to that usually done by the ordinary sweeps, horse-hoes, and gang-cultivators, inasmuch as the draft is less, and the ground is thoroughly pulverized by the scraper on top of and plow-hoe below the surface. The land is not packed and its pores closed to the detriment of the plants, as is the case with the sweeps and cultivators in common use.

Having thus described my invention, what I claim as new, and desire to secure by Letters Patent, is—

1. In a subsoil-plow, the openers A B C D and $a\ b\ c\ d$, having brackets $f\ f$, in combination with the colter having projections $p\ p\ p$, substantially as above described.

2. In a subsoil plow, the scrapers $k\ i\ x\ w\ z\ y$ and $g\ h\ t\ s\ u\ v$, having brackets $f\ f$, in combination with the colter having projections $p\ p\ p$, constructed substantially as specified.

JAS. W. MURFEE.

Witnesses:
B. TRAVIS,
WM. CHRISTIAN.